United States Patent [19]

Santi

[11] 4,356,401

[45] Oct. 26, 1982

[54] THERMO-ELECTRIC POWER STATION SUPPLIED BY GEOTHERMAL HEAT SOURCE

[76] Inventor: Gianio G. Santi, Via Fratelli Gabba 6, Milan, Italy

[21] Appl. No.: 161,007

[22] Filed: Jun. 19, 1980

[30] Foreign Application Priority Data

Jul. 3, 1979 [IT] Italy ............................. 24057 A/79

[51] Int. Cl.³ .............................................. F03G 7/00
[52] U.S. Cl. .................................. 290/1 R; 60/641.2
[58] Field of Search .................... 60/641, 641.2, 641.3, 60/641.4, 648, 651, 655, 671; 290/1, 1 R

[56] References Cited

U.S. PATENT DOCUMENTS

| | | | |
|---|---|---|---|
| 3,908,381 | 9/1975 | Barber et al. | 60/641 |
| 3,986,362 | 10/1976 | Becin | 60/641 |
| 4,009,575 | 3/1977 | Hartman, Jr. et al. | 60/648 |
| 4,084,379 | 4/1978 | Schwartzman | 60/641 |
| 4,102,133 | 7/1978 | Anderson | 60/641 |
| 4,120,158 | 10/1978 | Sheinbaum | 60/641 |
| 4,123,506 | 10/1978 | Spevak | 223/566 |

Primary Examiner—A. T. Grimley
Assistant Examiner—D. L. Rebsch
Attorney, Agent, or Firm—Gottlieb, Rackman & Reisman

[57] ABSTRACT

The invention concerns a thermo-electric power station, supplied by a geothermal heat source, involving the use of at least two fluids. The first fluid (water) makes it possible to transfer the geothermal energy from the subsoil to the power station. The fluid is pumped into the subsoil through a downcast shaft (29, 33) and returns, after being heated to a pre-established temperature, via an outlet shaft (28, 32). The second fluid is carbon dioxide, which, through direct contact with the first fluid, absorbs the latter's thermal energy and transforms it into mechanical energy via successive machines (7, 8, 9). A possible third fluid (ammonia) produces, in an absorption refrigerator plant (2), the refrigeration necessary for lowering the temperature and, therefore, the pressure of the second fluid when it leaves the last machine (9), thus making possible the pre-established optimal pressure stage.

6 Claims, 1 Drawing Figure

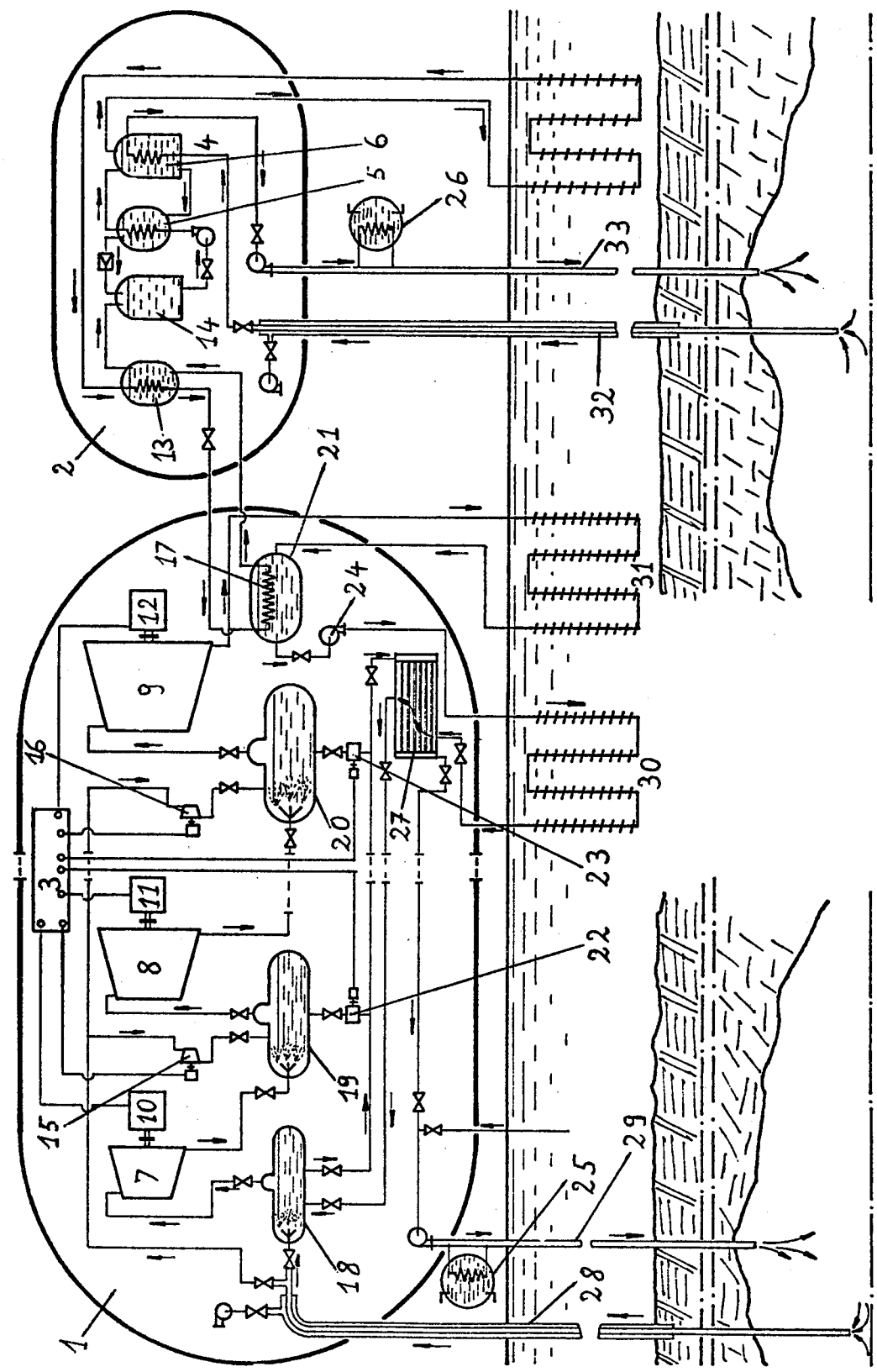

THERMO-ELECTRIC POWER STATION SUPPLIED BY GEOTHERMAL HEAT SOURCE

The invention concerns a thermo-electric power station supplied by a geothermal heat source, in which an initial fluid, being heated in the subsoil, provides energy for at least one power-generating machine.

Known thermo-electric power stations of this kind are mainly based on the concept of treating the fluid originating in the subsoil in such a way that it transfers energy to another fluid via special heat-exchangers, or else is used directly as the working fluid in power-generating machines.

The biggest problems presented by these applications, that call for painstaking solutions that are nearly always complicated and costly, are as follows:

Either finding vapors in the subsoil that would directly affect the location of the power station, or heating the working fluid by means of suitable heat-exchangers, and condensing the working fluid itself at a temperature corresponding to the outside temperature both of the air and of water. In this case, the heat-exchangers may, beyond a certain power, well take on prohibitive dimensions. However, the specific power obtainable is relatively low in relation both to the temperature of the working fluid and to the nature of the fluid itself.

This invention has taken the above considerations as its point of departure in proposing a plant that may solve all the aforementioned problems, or at least limit the difficulties involved. Specifically, its aims are as follows:

The plant should be able to be installed in an area in which there is a need to produce utilizable energy, and not just where geothermal energy may be available due to the natural emergence of fluid from the earth's crust. It is therefore necessary to look for the energy where it is required, so as to avoid being penalized by the high cost of long-distance energy transmission.

Working fluid for power-generating machines must possess the chief characteristic of being easily reintegrated in the event of losses in the plant.

The working fluid must enable the heat-exchangers to be of limited size.

The working fluid must make it possible to obtain high power values in relation to the thermal energy levels available.

The boiler must be of simple construction, economical both in construction and in operation, and, especially, must provide the maximum heat exchange, in order to limit the dimensions of the boiler.

The condenser must have the same characteristics as those just mentioned for the boiler, so as to limit its bulk.

The boiler output temperature must be boosted as high as possible, in order to be able to increase the power suppliable per unit of weight of the fluid treated.

The temperature of the fluid leaving the power-generating machine (turbine) must be kept as low as possible - even below the ambient temperature of the coolant water - in order to increase the available pressure stage, and to reduce to the minimum the energy required for recycling the fluid from the condenser to the boiler - which can be done by increasing to the maximum the specific gravity of the condensed liquid.

The energy expended on reducing temperature must be of geothermal origin.

The energy contained in the external water must be suitably utilized.

In order to solve the problems described, and to achieve the aforementioned aims, this invention proposes a thermo-electric power station supplied by a geothermal heat source, involving the use of at least two fluids in accordance with the following principles:

The first fluid (water) makes it possible to transfer the geothermal energy from the subsoil to the power station. This fluid is pumped into the subsoil through a downcast shaft, to be recovered, heated as required to a pre-established temperature, via an outlet shaft.

The second fluid is carbon dioxide, which, through direct contact with the first fluid, absorbs the latter's thermal energy and transforms it into mechanical energy, via one or more machines.

A possible third fluid (ammonia) produces, in an absorption refrigerator plant (again, using geothermal energy), the refrigeration necessary for lowering the temperature and, therefore, the pressure of the second fluid when it leaves the last machine, thus making possible the pre-established optimal pressure stage.

At the thermo-electric power station, in accordance with the invention, the geothermal energy transferred to the water, in the subsoil, is therefore utilized to heat the working fluid to the optimal temperature, and, possibly, to produce cold for the condenser at the minimum level possible, via the absorption refrigerator plant, in order to achieve the maximum available pressure stage.

According to the invention, the power station operates essentially with two or three fluids, as already stated. These are, more precisely:

Sea or fresh, surface water, as the intermediate fluid (first fluid) for thermal treatment of the carbon dioxide and the ammonia; this water is heated as required in the geothermal wells, and sets up a closed-circuit system between the power station and the wells.

Carbon dioxide, as the main working fluid for power-generating machines. Heating of the carbon dioxide as it enters the machines is effected by direct contact with the water from the geothermal wells; the thermodynamic cycle is achieved with a series of intermediate heating processes, in order to bring the polytropic and isothermal expansion transformations as close together as possible, due to the obvious advantages that this gives.

Ammonia, as a possible intermediate fluid for the thermal treatment of the carbon dioxide in the condenser under the lowest possible temperature and pressure conditions; the ammonia is used in an absorption refrigerator plant, to reduce the power requirement to the minimum.

The basic points that distinguish a thermo-electric power station in accordance with the invention from known types concern mainly the use of carbon dioxide as the working fluid in power-generating machines, as well as the use of a thermodynamic pressure-stage cycle, with heat emission between one stage and the next, and the use of absorption refrigerator plant.

The use of $CO_2$ as the working fluid in power-generating machines offers the following advantages:

$CO_2$ has relatively low solubility in hot water, and therefore, in order to heat it, it is possible to use water in direct contact, so as to obtain heat transfer between fluids that are practically separate from the chemical and physical point of view. In this way, heat exchangers in the boiler are completely eliminated. Contact between the water and the $CO_2$ can be achieved both by injecting water into the $CO_2$, and by scrubbing it in water. However, the low solubility of $CO_2$ in water reaches entirely negligible levels at the temperatures at which the heat exchange may be expected (>50° C.). In any case, even if a minimal quantity of $CO_2$ were carried away by the water into the subsoil and not recovered upon leaving the subsoil, there would be no problem, because:

The $CO_2$ can easily be restored on the spot and fed into the power station when necessary. Indeed, $CO_2$ can be made both simply and economically by various known methods.

$CO_2$ has extremely low latent heat values; it therefore calls for very limited heat-exchange surfaces in condensers.

$CO_2$ allows maximum flexibility of use because, by utilizing the coolant liquid at ambient temperature, it makes it possible to set up an extremely simple machine, but with specific power that is still acceptable, or, by utilizing the coolant liquid at lower-than-ambient temperatures, to build a plant with much higher specific power.

The use of a thermodynamic cycle with pressure stages, with the immission of heat between one stage and the next, creates favourable conditions for utilization and operation of the machine, by increasing the values of the power supplied per mass flow unit of the working fluid.

Lastly, use of an absorption refrigeration plant makes it possible to increase the levels of the specific power supplied by the machines, with negligible expenditure of mechanical power on the production of cold.

A thermo-electric power station in accordance with the invention consists, in general, mainly of one or more pairs of wells, a main power generating plant, possibly an absorption refrigeration plant, and possibly a plant for recovering the thermal energy output of the power station.

The wells are the same as those constructed for oil-drilling purposes. Water is fed into them, so that it may be heated and then brought back to the surface at the required temperature. Each pair of wells is therefore like a boiler, with an entrance and an exit. The latter is suitably insulated in order to limit loss of heat, while the speed of the water-flow in the pipe is determined in such a way as to achieve optimization of both heat exchange and loss of mechanical load.

The main power-generating plant can be built on the surface, on land or on the sea, or on the sea-bed, or on the bed of a lake. In this plant, the hot water transfers part of its thermal energy to the carbon dioxide by means of direct contact between these two fluids in special boilers. The carbon dioxide, in the vapour phase, from the pressure and temperature levels reached in the boiler, is made to expand via a machine, or series of machines, to generate the power required. In the second case, the said machines are arranged in cascade to each other, in such a way that the fluid output of each can be heated, in a subsequent boiler, up to the initial temperature, thus obtaining as many expansions with identical temperature stages and with the same input and output pressure ratios in each machine. The dimensions of the machines and boilers will naturally be different in relation to the different values for the specific volumes of carbon dioxide in the different stations. Thus an expansion is achieved, between the initial and final pressure values, with successive injections of thermal energy, in such a way as to get as close as possible to isothermal expansion, which, as is known, makes it possible to obtain greater specific powers than by polytropic expansion. On leaving the last machine, the carbon dioxide is cooled and liquefied in a special condenser, after which it is again pumped into the boiler and resumes the cycle. Cooling and heating the carbon dioxide, both upstream and downstream of the condenser, are achieved by means of heat-exchangers, which utilize the energy present in the external water.

The refrigeration plant is of the ammonia absorption type. It makes it possible to create the conditions required for the condenser with the lowest possible pressure and temperature values, thus increasing the specific power supplied by the machines, and reducing the energy required for pumping the carbon dioxide into the boiler in relation to the higher specific gravity values obtained at minimum temperatures.

For heating the $H_2O$ - $NH_3$ solution, the plant uses the energy available in the water (steam) from the aforementioned pairs of wells, or from other similar pairs of wells independent of the first pair, and with water output temperature levels that may be different from the previous ones, depending upon needs.

The absorption refrigerator plant should, for convenience, be located at or adjacent to the site of the main power generating plant.

If it is not intended to have a refrigerator plant, cooling and liquefaction of the $CO_2$ vapour leaving the last machine are achieved by heat exchange with the external water, lower power station performance levels being in this case accepted.

It is planned - and will also be economically advantageous - to set up an effluent heat recovery plant suitable for utilizing the low-grade energy still contained in the hot water leaving the main power plant, or the refrigerator plant. In this way, it is possible to optimize, in the best possible way, the thermal energy originating from the geothermal wells, by pumping into the subsoil the water with the lowest energy level. This consideration is not, however, decisive, since it might also be economical, in special cases, to limit the difference between the input and output temperatures of water entering or leaving each pair of wells.

A description is given hereunder of the FIGURE, showing the creation of a thermo-electric power station in accordance with this invention - not that, of course, the invention is limited to the example of this FIGURE.

In the example shown in the schematic drawing, the power station includes a pair of wells (29, 28), suitable for feeding water into the subsoil and recovering it, duly heated. The power staton has a series of boilers (18, 19, 20) which are provided for obtaining the $CO_2$ vapor required for supplying the power-generating machines, which in this example are turbines, as specified hereunder.

The power-generating machines are a series of turbines (7, 8, 9), which are coupled to electric generators (10, 11, 12) for the production of the power required by the power station. A series of pumps (22, 23) for pumping the water effluent from the boilers into the circuit of the well, which feeds the water into the subsoil, is also included; as is a series of hydraulic turbines (15, 16) for recovery of the excess energy in the water entering the boilers. In order to create thermodynamic conditions for outflow from the last turbine (9), condenser (21) is included.

An absorption refrigerator plant (2) consisting mainly of a pair of wells (32, 33), suitable for feeding water into the subsoil and recovering it, duly heated, is shown in the drawing. These wells may also be the same ones (28, 29) as used in th power station. The absorption refrigerator utilizes a boiler (6) for thermal treatment of the $NH_3$ - $H_2O$ solution. An evaporator (17) is integrated with the condenser (21), to produce the refrigeration necessary for treating the $CO_2$. An absorber (14) restores the $NH_3$ - $H_2$ solution to be fed into the boiler (6).

The system also includes a series of heat exchangers (30, 31, 27, 4, 5, 13) for the thermal treatment of the $CO_2$, $NH_3$; a series of expanders (25, 26) for recovering the thermal energy in the water effluent; and an electric power station for distributing the energy (3).

The thermo-electric power station operates as follows:

The hot water coming from the subsoil via the well (28), at a selected pressure $P_p$ and a temperature tp, is fed into the boiler (18) by means of nozzles, and suitably atomized in such a way as to heat and vaporize the $CO_2$, which is pumped by the condenser (21) to the boiler (18) by means of a special pump (24).

The $CO_2$ vapor produced in the aforesaid boiler and collected in the latter's dome, at a temperature of $ti_1 < tp$, is fed into the turbine (7), to generate the mechanical power corresponding to a thermal stage of $ti_1$-$tu_1$.

To the output temperature $tu_1$ there corresponds a pressure of $pu_1$. Thus, in the first turbine, there occurs an initial transformation of thermal energy into mechanical energy, between pressure values of $P_p = Pi_1$ and $Pu_1$ and temperature values of $ti_1$ and $tu_1$, respectively.

On leaving the turbine (7), the vapor, at a pressure of $Pu_1$ and a temperature $tu_1$, is fed into the second boiler (19), in which, again by means of the hot water coming from the well (28) at a temperature tp, it is heated, at a constant pressure of $Pi_2$, from a temperature of $tu_1$ to a temperature of $ti_2 = ti_1$. The excess energy in the water entering the boiler (19) in relation to the higher pressure ($P_p > Pi_2$) makes it possible to recover that energy by means of the hydraulic turbine (15). The process of expansion of the $CO_2$ proceeds, again with intermediate heating between one turbine and the next, up to the last turbine (9), upon leaving which the vapor temperature and pressure values are $tu_n = tu_1$ and $Pu_n$, respectively.

The $CO_2$ vapor is then treated in the condenser (21), after pre-cooling in the exchanger (31) operating on external water, and is liquefied at a temperature of $tu_f$, pre-established on the basis of the characteristics of the refrigerator plant. The pressure $Pu_f \leq Pu_n$ prevailing in the condenser will be the one corresponding to the temperature $tu_f$ in the transition from the vapor to the liquid state.

From the condenser (21), the liquid $CO_2$ is repumped into the boiler (18) by the pump (24), as already stated, and the process is resumed.

A heat-exchanger (30) and a subsequent heat-exchanger (27), downstream of the condenser (21), enable the $CO_2$ to be preheated before it enters the boiler (18), thus utilizing the energy available in the external water and in the water returning to the subsoil via the well (29), respectively.

The pums (22, 23) enable the water leaving the boilers (19, 20) to be fed back into the return circuit to the subsoil, as already stated.

A pair of wells (28, 29), similar to the previous one, make it possible to heat, in the subsoil, the water required for operating the absorption refrigerator plant (2), which is suitable for producing the refrigeration needed for the condenser (21). The operating layout of the absorption refrigerator plant, shown in the FIGURE, is a conventional one, and is not therefore discussed here.

The water returning from the boilers (18, 19, 20) and from the refrigerator plant (2), before being fed back into the subsoil via the wells (29, 33), are utilized to heat, in the boilers (25, 26), a suitable quantity of external water for other needs.

I claim:

1. A thermo-electric power station, supplied by a geothermal heat source, in which water being heated in the subsoil, transfers its energy to at least one power-generating machine, characterized by the fact that the power station operates with water and carbon dioxide, comprising:

a source of water adapted to be heated by geothermal energy; means including at least one well (29, 33) for pumping the water into the subsoil; means including at least one insulated well (28, 32) for recovering the water heated to a pre-established temperature at the power station;

a source of carbon dioxide; means (18) for bringing the carbon dioxide in direct contact with the water for absorbing the thermal energy in the water;

means (7) for transforming the thermal energy of the carbon dioxide into mechanical energy; and pumping means (22, 23) for re-injecting the water into the subsoil.

2. A thermoelectric power station in accordance with claim 1, wherein the first and second fluids are brought in contact by injecting the water into the carbon dioxide.

3. A thermoelectric power station in accordance with claim 1, wherein the first and second fluids are brought into contact by bubbling the carbon dioxide in the water.

4. A thermo-electric power station in accordance with claim 1, further comprising a third fluid; means utilizing geothermal energy provided by the water (2) for cooling the third fluid; and means (21) utilizing the third fluid for lowering the temperature and pressure of the second fluid as it leaves the energy transforming means.

5. A thermoelectric power station in accordance with claim 1, wherein said means for bringing the first fluid in contact with the second fluid includes a plurality of boilers (18, 19) and said means for transforming the thermal energy into mechanical energy includes a plurality of power generating machines (7, 8), said boilers and said power generating machines being in cascade such that the second fluid leaving one of the power generating machines (7) is heated by one of the boilers (19).

6. A thermoelectric power station in accordance with claim 5, wherein on leaving the last power generating machine (9), the second fluid is cooled and liquified in a condenser (21), said second fluid then being pumped into the first boiler (18).

* * * * *